United States Patent
Tang

(10) Patent No.: US 6,940,915 B2
(45) Date of Patent: Sep. 6, 2005

(54) ADAPTIVE LEARNING METHOD AND SYSTEM TO ADAPTIVE MODULATION

(75) Inventor: K. Clive Tang, Irving, TX (US)

(73) Assignee: Nokia Mobile Phones Ltd., Espoo (FI)

( * ) Notice: Subject to any disclaimer, the term of this patent is extended or adjusted under 35 U.S.C. 154(b) by 895 days.

(21) Appl. No.: 09/751,640

(22) Filed: Dec. 29, 2000

(65) Prior Publication Data

US 2002/0099529 A1 Jul. 25, 2002

Related U.S. Application Data

(60) Provisional application No. 60/850,242, filed on Nov. 30, 2000.

(51) Int. Cl.$^7$ ............................................... H04L 23/02
(52) U.S. Cl. ...................... 375/261; 375/259; 375/286; 375/288; 375/219; 375/262; 370/252; 370/347; 370/234
(58) Field of Search ................................. 375/219, 259, 375/261, 262, 286, 288; 370/234, 252, 347, 401

(56) References Cited

U.S. PATENT DOCUMENTS

| | | | | |
|---|---|---|---|---|
| 5,764,699 A | * | 6/1998 | Needham et al. ........... 375/261 |
| 5,909,469 A | * | 6/1999 | Frodigh et al. ............. 375/302 |
| 6,359,934 B1 | * | 3/2002 | Yoshida ....................... 375/262 |
| 6,363,513 B1 | * | 3/2002 | Hekstra ....................... 714/786 |
| 6,452,964 B1 | * | 9/2002 | Yoshida ....................... 375/222 |
| 6,714,551 B1 | * | 3/2004 | Le-Ngoc ..................... 370/401 |

FOREIGN PATENT DOCUMENTS

| | | |
|---|---|---|
| EP | 0845916 A2 | 9/1997 |
| WO | WO 99/12302 A1 | 3/1999 |
| WO | WO 00/76109 A1 | 12/2000 |

\* cited by examiner

*Primary Examiner*—Anthony Knight
*Assistant Examiner*—Ronald D Hartman
(74) *Attorney, Agent, or Firm*—Steven A. Shaw

(57) ABSTRACT

In recent years adaptive modulation has emerged as a popular technique to improve data throughput and system capacity in a wireless system. The basic idea is to adapt the modulation scheme to the fading channel quality, using different schemes for different channel conditions. Therefore one primary issue is to determine the switching thresholds between the modulation schemes. Typically these thresholds are fixed according to a certain criterion. This paper introduces a novel adaptive learning approach that is capable of dynamically adjusting the thresholds so as to maximize the throughput. A key feature of the proposed self-learning scheme is that no dedicated training signal is required, instead it utilizes the long-term average throughput to continuously update the thresholds as the data is transmitted.

3 Claims, 2 Drawing Sheets

ADAPTIVE LEARNING METHOD AND SYSTEM TO ADAPTIVE MODULATION

CROSS-REFERENCE TO RELATED APPLICATIONS

This patent application is related to U.S. Provisional Application No. 60/250,242 filed on Nov. 30, 2000.

FIELD OF THE INVENTION

This invention relates generally to data transfer systems and in particular to a means for identifying data so that most efficient service may be used for transfer of the data in a communication system.

BACKGROUND OF THE INVENTION

The explosion in Internet usage in recent years has greatly accelerated the widespread use of TCP/IP protocols suite as well as a dramatic increase in packet data traffic. With the ever rising demand of mobility and M-commerce, it is logical to extend such protocols into the wireless world. However, the existing 2G wireless systems. Examples of such systems are Global System for Mobile Communication (GSM), IS-95, IS-136 and the like, which are primarily built for traditional voice communications. Such circuit-switched networks are not well-suited for sending data. For instance, the data rate supported in GSM is only up to 14.4 kbit/s. Although 3G technologies can handle packet data more effectively and may achieve a peak rate of 2 Mbit/s (under favorable conditions), they have to accommodate circuit-switched data at the same time. Therefore, there should still be room for improvement for packet data transmission.

Meanwhile the growing popularity of Transmission Control Protocol/Internet Protocol(TCP/IP) leads one to seriously consider the possibility of a new generation of wireless services running solely on TCP/IP protocols that are capable of supporting both voice and data communications. That is, using voice over IP (VoIP) telephony, speech signals are transported as packet data and integrated together with other packet data in the network. Such a packet-based network in the long term may well replace the traditional circuit-switched networks, thus resulting in a unified wired and wireless IP networks for both voice and data, with many advantages like economics of scale, seamless services, global standardization, and the like.

It is well-known that voice and data transmission have different requirements. One fundamental difference between wireless voice and data communications is their behavior in a time-varying Radio Frequency (RF) channel. Voice may only accept a latency of up to about 100 msec,; however, data may bear a much larger value. Voice transmission also requires a certain minimum signal-to-noise (SNR) ratio to be met a good channel quality would not necessary improve the speech quality, but a poor channel may cause serious deterioration. On the other hand data is more flexible, data flow may be increased in good channels to boost the throughput, and, conversely, it may be reduced in poor conditions in exchange for a lower bit error rate (BER).

Capitalized on these differences the idea of link adaptation or adaptive modulation, which is the technique adopted in Enhanced Data for GSM Evolution (EDGE) to push the maximum data rate to beyond 384 kbit/s, has emerged recently. In this concept the modulation constellation, coding scheme, transmitter power, transmission rate, and the like, are adapted to the fading channel quality. When the channel is good, a high order modulation with little or no coding is used, conversely when the channel is bad a low order robust modulation is chosen. Several camps of academic researchers have contributed to this subject. Via theoretical and simulation studies, they showed that data throughput and system capacity may be improved or optimized while maintaining an acceptable bit error performance.

Typically, the channel quality is assessed by the instantaneous signal-to-noise (SNR) ratio, which is divided into a number of fading regions, with each region mapping into a particular modulation scheme. Thus one basic issue in adaptive modulation is to determine the region boundaries or switching threshold, i.e. when to switch between different modulation schemes. A common method of setting the thresholds to the signal-to-noise ratio (SNR) required to achieve the target Bit Error Rate (BER) for the specific modulation scheme under additive white Gaussian noise (AWGN) has been shown in the art. While this maintains a target BER, this does not optimize the data throughput which is probably a more important concern for data transmission. In Nokia's (Finland and Irving, Tex.) joint "1XTREME proposal" with other companies to 3GPP2, the switching thresholds are derived from steady state throughput curves of the individual modulation schemes. This increases the throughput relative to the previous method but still is not optimal. For packet data transmission in a time-varying channel, what would be desirable is an on-line adaptive scheme that can adjust the switching thresholds dynamically to maximize the throughput.

SUMMARY OF THE INVENTION

A new approach to modulation-level-controlled adaptive modulation has been provided. A simple example illustrates that it is possible to adopt an adaptive learning technique to select the switching thresholds so as to optimize a performance criterion. Main features of this self-learning scheme are its ability to continuously optimize the thresholds as the data is transmitted, and without the need of a dedicated training signal. Advantages of learning automata include global optimization capability, operation in both stationary and non-stationary environments, and simple hardware synthesis by means of basic stochastic computing elements. All these render adaptive learning techniques an interesting topic to pursue for adaptive modulation.

A BRIEF DESCRIPTION OF THE DRAWINGS

The above set forth and other features of the invention are made more apparent in the ensuing Detailed Description of the Invention when read in conjunction with the attached Drawings, wherein.

DETAIL DESCRIPTION OF THE INVENTION

The present application provides for a scheme for an on-line adaptive scheme that can adjust the switching thresholds dynamically to maximize the throughput. We first set up a simulation system comprising of selectable, convolution encoded QPSK, 16QAM and 64 QAM sources, a flat Rayleigh fading channel model, coherent demodulators and soft Viterbi decoders. By means of this test bed, the effect of altering the switching thresholds on the data throughput can be revealed. It will be shown that a significant increase in throughput may be obtained by merely altering the value of one threshold. Next, an on-line adaptive learning scheme will be introduced that is capable of adaptively optimizing the switching thresholds as the data is transmitted. A key feature of this self-learning scheme is that it does not require a dedicated training signal, instead it utilizes the long-term throughput as the referee to train up the learning algorithm. The scheme will be demonstrated to converge to the best threshold value available that maximizes the long-term average throughput.

System Model

To study the application of novel learning schemes, we start with a simple system model and operating scenario. A straightforward system configuration with basic settings is preferred as the current aim is to explore new ideas and novel concepts. We assume that the modulation scheme selection in the transmitter is reliably passed on to the receiver so that the data may be properly demodulated. We also suppose that information regarding failure frames is available to the transmitter (e.g. a single bit from the receiver to indicate whether or not the transmitted frame passes the CRC). In a practical system, these may be implemented by reserving extra slot spaces in both forward and reverse links. Furthermore, we assume perfect channel estimates are available so that coherent demodulation may be performed.

Figure 1:
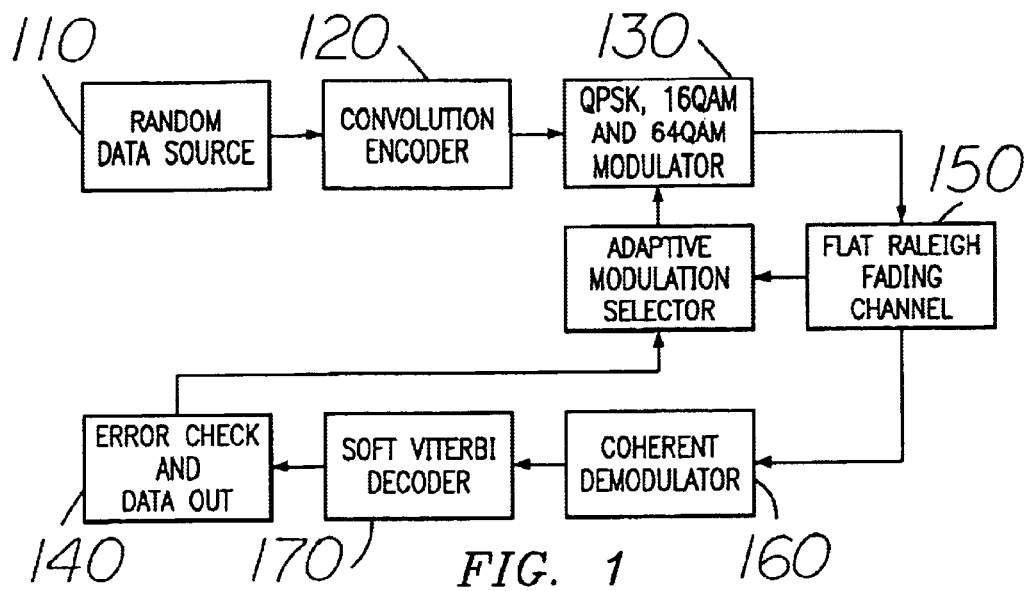
FIG. 1 shows block diagram of the test system is shown 3in.

A block diagram of the test system is shown in FIG. 1. A random source 110 is used to generate a stream of binary digits, from which 184 bits are taken at a time and 8 flush bits added to form a frame. The created frame is then encoded by use of a convolution encoder 120 with constraint length K=9 and a rate R=½. (The frame structure and generator polynomial are taken from the latest cdma2000 standard as an example. Those skilled in the art after reading the specifications may arrive at variations which are deemed to be in the spirit and scope of the invention). One frame of data thus corresponds to 384 encoded bits. Three different schemes 130 are available to modulate the encoded bits–QPSK, 16QAM and 64QAM which takes in 2, 4 or 6 encoded bits respectively at a time to create a modulated symbol. A modulated frame, which comprises of 192 modulated symbols, therefore consists of either 1, 2 or 3 frames of data. For a given modulated symbol rate x, the frame rate y is thus equal to x/192 resulting in a data rate varying from 184y to 552y.

The channel model used is a single path flat slow Rayleigh fading channel 150 with the Doppler frequency set to 5 Hz. Because the channel fades slowly, the channel is only monitored once per frame, at the beginning of the frame. The appropriate modulation scheme is chosen based on the measured instantaneous SNR, with the scheme maintained for the entire frame of data. That is, the modulation scheme is only allowed to vary on a frame-by-frame basis.

At the receiver, the symbols are coherently demodulated 160 and soft Viterbi decoded 170 to recover the original data. One frame of demodulated symbols are decoded at a time, producing 1, 2 or 3 frames of data depending on the modulation scheme used. Frame error information is fed back to the transmitter 140.

In the present application, the transmitted power level and the coding rate are kept constant, we only focus on adapting the data transmission rate by varying the modulation scheme according to the measured SNR. When the channel condition is very bad, no data transmission takes place. Hence it is a modulation-level-controlled adaptive modulation, in a similar manner as described in art.

In addition to BER, the performance of the adaptive modulation system may be assessed by the long-term Frame-Error-Rate (FER), defined as the ratio of the number of corrupted frames to the total number of data frames transmitted; and the normalized long-term average throughput TP, defined as TP=(1−FER)*FPB, where FPB is the average frames-per-burst that varies from 1 to 3. The maximum value of TP is 3, when data is transmitted with 64QAM and no frames are received in error (i.e. FPB=3 and FER=0). The minimum value is 0, when all frames are corrupted or no transmission occurs (i.e. FPB=0 or FER=1).

Determination of Switching Thresholds

Figure 2:
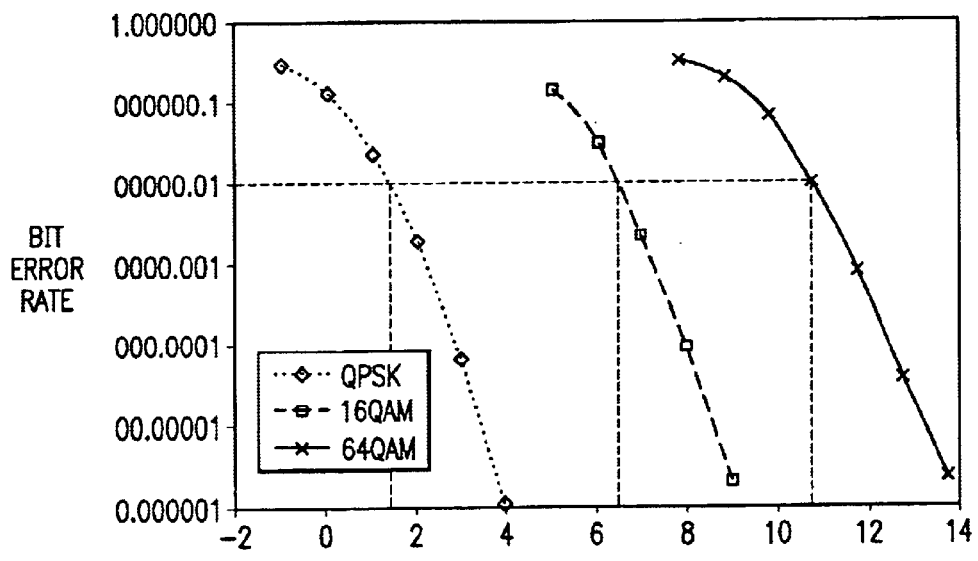
FIG. 2 is graph showing of BER vs SNR.

In a modulation-level-controlled adaptive modulation the key parameters are the switching thresholds that determine when to switch from one modulation scheme to another. In the present system, that employs three modulation schemes. There are three switching thresholds to be determined—from no transmission to QPSK (threshold L1), from QPSK to 16QAM (threshold L2), and from 16QAM to 64QAM (threshold L3). One approach is to set the thresholds as the SNR required to achieve a certain target BER for the specific modulation scheme under AWGN. By first plotting a set of BER vs SNR graphs as depicted in FIG. 2, and then setting a target BER the switching thresholds L1, L2 and L3 may be read directly from the graph. For instance, for a target BER of 0.01, L1, L2 and L3 may be set to 1.4, 6.6 and 10.8 dB respectively as indicated by the dotted lines. This setting maintains the target BER, however it does not optimize the data throughput. Torrance and Hanzo also suggested a numerical optimization method, but it requires the throughput to be obtainable as an analytical function of the thresholds which is generally unavailable in a practical system.

Figure 3:
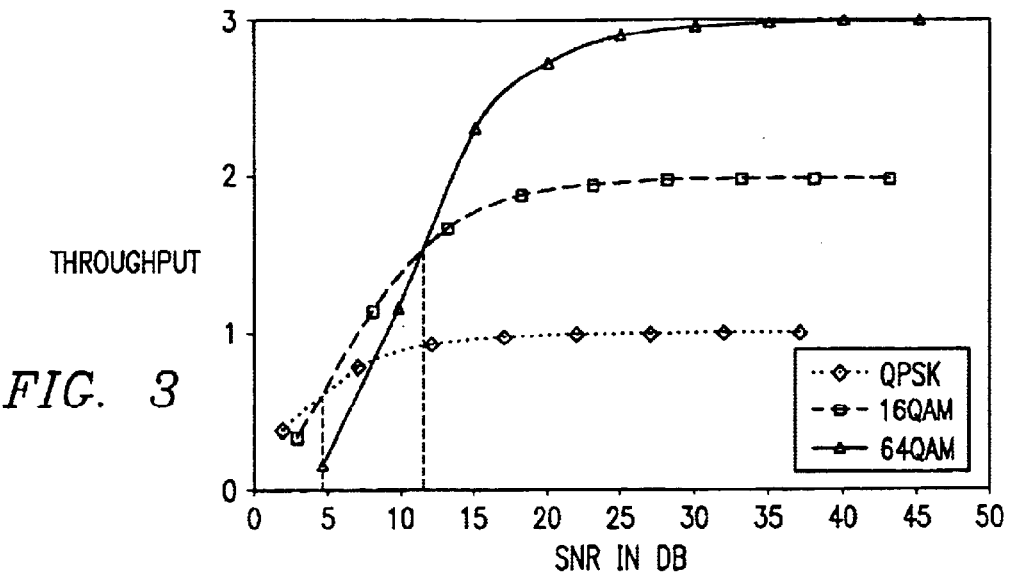
FIG. 3 shows a graph of the switching thresholds that are derived from steady state throughput curves of the individual modulation schemes.

In Nokia's joint 1XTREME proposal to 3GPP2, the switching thresholds are derived from steady state throughput curves of the individual modulation schemes. FIG. 3 shows such a graph for the test system. The idea is to use the modulation scheme that gives the best throughput for the given SNR. The switching thresholds are suggested by the dotted lines, but the graph does not tell when to turn on from no transmission to QPSK (threshold L1). This method may increase the throughput relative to the previous one, however it is still not optimal.

Simulations in the test system quickly revealed that the average BER, FER and TP can vary a lot by altering the switching thresholds. This, coupled with the time-varying nature of a RF channel, suggests what would be desired is an on-line adaptive scheme that tailors the switching thresholds dynamically to maximize the throughput (or other chosen criteria) as the data is transmitted. Furthermore, because of the difficulties in deriving TP as an analytical function of the switching thresholds in practical situations, it would be advantageous to use a self-learning method that does not utilize expressions of TP and the thresholds, nor makes any assumption of the operating environment. The scheme should be able to carry out global optimization in case the performance criterion is a multi-modal function. Equally important is that it should be easily implemented in a mobile transceiver. It would also be attractive not to use any dedicated training sequence in order to reduce the overhead. A class of adaptive learning techniques, namely stochastic learning automata, fits in this description and is hereby proposed as the modulation selector.

Figure 4:
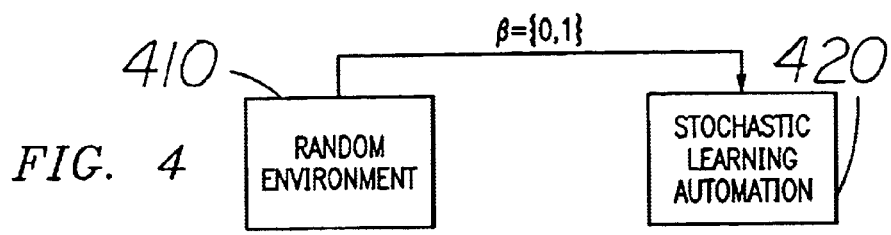
FIG. 4 shows a block diagram of an automaton/environment model.

FIG. 4 shows a block diagram of an automaton/environment model. In general, a stochastic learning automaton 420 may be defined as an element which interacts with a random environment 410 in such a manner as to improve a specific overall performance by changing its action probabilities dependent on responses received from the environment. An automaton is a quintuple $\{\beta, \phi, \alpha, F, G\}$ where $\beta=\{0,1\}$ is the input set (output from the environment), $\phi=\{\phi_1, \phi_2, \ldots, \phi_s\}$ is a finite stage set and $\alpha=\{\alpha_1, \alpha_2, \ldots, \alpha_r\}$ is the output action set (inputs to the environment). $F:\phi\times\beta\to\phi$ is a state transition mapping and $G:\phi\to\alpha$ is the output mapping.

We restrict our attention to variable structure automaton described by the triple $\{\beta, T, \alpha\}$. Here T denotes the rule by which the automaton updates the probability of selecting certain actions. At stage n assuming r actions each selected with probability $p_i(n)(i=1, 2, \ldots, r)$ we have, $$p_i(n+1)=T[p_i(n), \alpha(n), \beta(n)]$$

A binary random environment (also known as a P model) is defined by a finite set of inputs $\alpha:(\alpha_1, \alpha_2, \ldots, \alpha_r)$ (outputs from the automaton), an output set $\beta=(0, 1)$ and a set of penalty probabilities $c=(c_1, c_2, \ldots, c_r)$. The output $\beta(n)=0$ at stage n is called a favorable response (success) $\beta(n)=1$ an unfavorable response (failure). The penalty probabilities are defined as, $$c_i=\text{Prob}[\beta(n)=1|\alpha(n)=\alpha_i]$$

Both linear and non-linear forms of updating algorithms T have been considered. The most widely used are the class of linear algorithms which include linear reward/penalty (LRP), linear reward/εpenalty (LRεP) and linear reward/inaction (LRI). For the LRP scheme, if an automaton tries an action $\alpha_i$ which results in success, $p_i(n)$ is increased and all other $p_j(n)$ ($j\neq i$) are decreased. Similarly if action $\alpha_i$ produces a penalty response, $p_i(n)$ is decreased and all other $p_j(n)$ modified to preserve the probability measure. A LRI scheme ignores penalty responses from the environment and LRεP only involves small changes in $p_j(n)$ compared with changes based on success. Important convergence results have long been proved for these algorithms. Hardware synthesis of the learning algorithms has also been well established.

To apply a learning automaton as an adaptive modulation controller, its output is regarded as a set of switching thresholds. That is, the thresholds are partitioned into a number of combinations, the number of combinations being equal to the number of automaton output actions. The task of the automaton is to choose an action that gives the best throughput. The environment represents the operating environment of the modulation selector. A long term average throughput TP is chosen as the performance measure of the action chosen. The automaton uses a learning algorithm to update the output probability vector to govern the choice of switching thresholds.

Simulation Details

Figure 5:
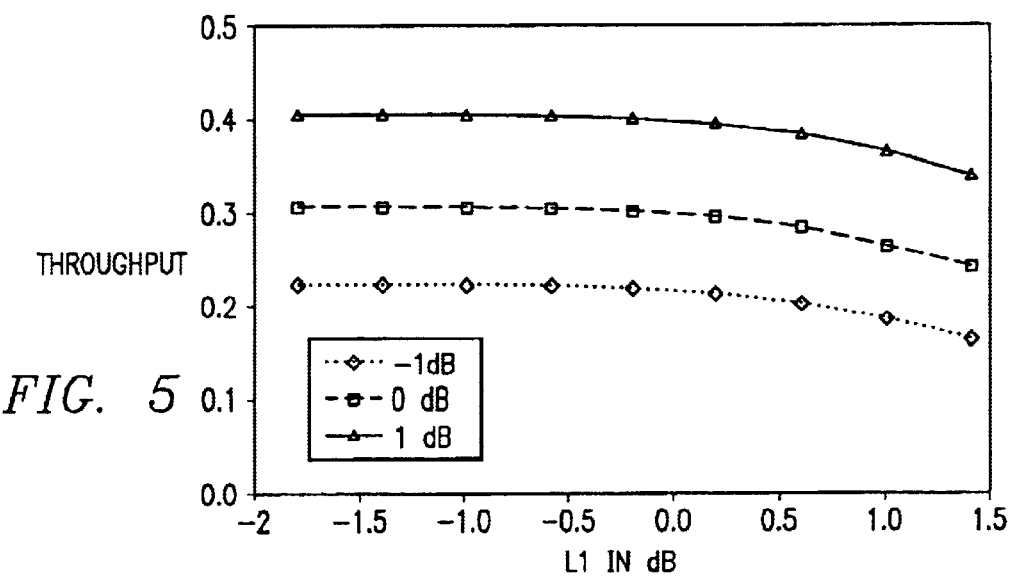
FIG. 5 shows the normalized long-term average TP versus L1 for for SNR of −1,0, and 1 dB.

The simulation configurations were based on the system model described above. Variations and modifications are deemed to be within the spirit and scope of the present invention. To demonstrate the concept of the proposed approach, we confine ourselves to a simple case of only allowing L1 to vary while keeping L2 and L3 at fixed values. L1 is expected to have a critical effect on all of BER, FER and TP in low SNR conditions since it dictates whether or not to transmit the frame burst. If a frame of data is transmitted and corrupted, it will result in an increase in BER and FER. On the other hand if it is not transmitted FPB will be reduced. Simulations were set up in low SNR scenarios and a set of reference results was obtained for several values of L1, ranging from −1.8 to 1.4 dB. L2 and L3 were fixed at 6.6 and 10.8 dB respectively. A graph of normalized long-term average TP versus L1 is shown in FIG. 5 for the SNR of −1, 0 & 1 dB.

Even in this limited situation, it is seen that up to 35% difference in TP may be obtained by just altering L1. In this case it was observed that TP approaches its maximum value when L1 is smaller than approximately −0.8 dB. Although a further decrease in L1 increased FPB, it produced a higher FER (and BER) at the same time. The net outcome is that no more improvement in TP resulted. This and other simulations also tend to suggest that the optimal values of the thresholds (that maximizes TP) may vary with SNR.

A two-action automaton running a LRI update algorithm was applied to select L1 from two allowed values. Three cases were considered for different SNR ranging from −1, 0 to 1 dB. The mapping from the two-action (0, 1) to the threshold L1 was chosen as shown in the following table,

|  | Action 0 | Action 1 |
|---|---|---|
| SNR = −1 dB | −0.2 dB | 1.4 dB |
| SNR =  0 dB | −1.0 dB | 0.6 dB |
| SNR =  1 dB | 0.6 dB | 1.4 dB |

Figure 6:
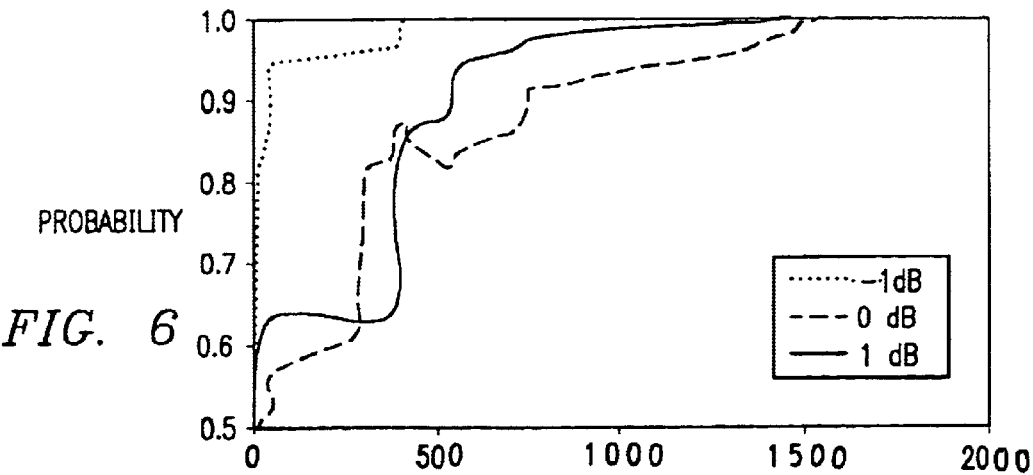
FIG. 6 shows the probability convergence curves of desired action for SNR of −1,0, and 1 dB.

In all the three tests it was found that the automaton converged to the correct action that produces a higher TP. Whenever the instantaneous SNR fell in the range affected by L1, the automaton kicked in. The probabilities were updated in a frame-by-frame basis, starting from a probability of 0.5 for each action, based entirely on the measured performance criterion. The fading channel model and noise level had no direct effect on the learning process. Only the chosen performance criterion, a long-term averaged TP, decided how the probabilities were altered. After a certain number of frame bursts, or trials, the probability for selecting the 'good' action gradually increased to 1.0, while that for the 'bad' action decreased to 0.0. FIG. 6 depicts the convergence characteristics for picking up the 'good' actions, namely action 0 in all the three cases.

The example in the last section serves to illustrate the use of learning automaton as a self-learning scheme for adapting the switching thresholds. The LRI algorithm was found to be able to pick up the correct action that produces a higher TP. It is also possible to increase the number of actions to a bigger number, and to use the automaton to select more than one thresholds. All is needed is to partition the thresholds into a number of values, with each automaton action maps into a set of them. The application of automata to parameters optimization has already been successfully demonstrated in other related subjects.

The current aim is to solely maximize the long-term average throughput which is an important performance measure in a wireless packet data system. However, the proposed scheme is versatile enough to accept other complicated cost functions in order to satisfy more restrictive criteria, for example, to maintain a specific BER or FER while maximizing the throughput, or to co-exist with higher layer ARQ techniques. Further work may be directed towards these areas.

What is claimed is:

1. In a communication system, a transceiver for transmitting and receiving signals comprising:
   a modulator for providing a plurality of modulation methods;
   an adaptive modulation selector coupled to said modulator for dynamically selecting at least one modulation method from said plurality of modulation methods in response to at least one switching threshold chosen from a plurality of switching thresholds; and
   an optimizer trained by using a self-learning automaton, said optimizer for optimizing said plurality of switching thresholds in order to maximize throughput.

2. The transceiver of claim 1, wherein said switching thresholds are optimized as a result of a training technique performed on said automaton.

3. A method for communicating in a communication system having a first communication station operable to transmit a signal modulated using at least one of a plurality of modulation methods comprising:
   determining, by using a self-learning automation wherein the output of said automaton represents a plurality of switching thresholds;
   selecting a modulation method from said plurality of modulation methods in response to at least one switching threshold chosen from said plurality of switching thresholds; and
   an modulating said signal suing said selected modulation methods; and
   transmitting said modulation signal.

* * * * *